United States Patent
Ziegelmeyer

(10) Patent No.: US 10,821,524 B2
(45) Date of Patent: Nov. 3, 2020

(54) DRILLING DEVICE FOR MACHINING TUBES IN TUBE SHEETS IN A RADIOACTIVE ENVIRONMENT

(71) Applicant: Westinghouse Electric Germany GmbH, Mannheim (DE)

(72) Inventor: Fritz Ziegelmeyer, Bad Schoenborn (DE)

(73) Assignee: Westinghouse Electric Germany GmbH, Mannheim (DE)

(*) Notice: Subject to any disclaimer, the term of this patent is extended or adjusted under 35 U.S.C. 154(b) by 49 days.

(21) Appl. No.: 16/345,721

(22) PCT Filed: Nov. 7, 2017

(86) PCT No.: PCT/EP2017/001291
§ 371 (c)(1),
(2) Date: Apr. 28, 2019

(87) PCT Pub. No.: WO2018/086733
PCT Pub. Date: May 17, 2018

(65) Prior Publication Data
US 2019/0299300 A1    Oct. 3, 2019

(30) Foreign Application Priority Data
Nov. 8, 2016  (DE) .......................... 10 2016 013 247

(51) Int. Cl.
*B23B 41/00* (2006.01)
*F22B 37/00* (2006.01)
(Continued)

(52) U.S. Cl.
CPC ............ *B23B 31/263* (2013.01); *B23B 41/00* (2013.01); *B23B 41/10* (2013.01); *F22B 37/005* (2013.01); *B23B 2215/72* (2013.01)

(58) Field of Classification Search
CPC ....... B23B 31/263; B23B 41/00; B23B 41/10; B23B 2215/72; B22B 37/005
See application file for complete search history.

(56) References Cited

U.S. PATENT DOCUMENTS 4,373,855 A * 2/1983 Lebouc ................. F22B 37/006
228/32
4,406,856 A * 9/1983 Wilkins ................ B23P 19/022
165/76

(Continued)

FOREIGN PATENT DOCUMENTS

| DE | 38 40 569 A1 | 6/1989 |
| DE | 40 29 978 A1 | 4/1991 |
| EP | 0 480 382 A1 | 4/1992 |

OTHER PUBLICATIONS

International Preliminary Report on Patentability for PCT/EP2017/001291, dated May 14, 2019.
(Continued)

*Primary Examiner* — Sunil K Singh
*Assistant Examiner* — Paul M Janeski
(74) *Attorney, Agent, or Firm* — Katterle Nupp LLC; Robert Nupp; Paul Katterle

(57) ABSTRACT

The present disclosure relates to a drilling device for machining tubes in tube sheets of heat exchangers in a radioactive environment. A retaining plate is clampable in the tubes with at least two retaining fingers on a first side and a first drive, which drives a tool shaft, is arranged on a second side. A tool chuck on a first end side of the tool shaft is connected detachably to the latter, wherein a forward feed of the tool shaft is brought about by a feed device. In addition, the tool chuck is unlockable from the tool shaft by way of an unlocking instrument and the unlocking instrument is controllable by a remote-control device.

14 Claims, 2 Drawing Sheets

(51) Int. Cl.
    *B23B 31/26*    (2006.01)
    *B23B 41/10*    (2006.01)

(56) References Cited

U.S. PATENT DOCUMENTS

| | | | | |
|---|---|---|---|---|
| 4,639,994 | A * | 2/1987 | Cooper, Jr. ........... | B23P 19/022 29/402.01 |
| 4,688,327 | A * | 8/1987 | Cooper, Jr. ............... | B23P 6/00 29/723 |
| 4,718,377 | A * | 1/1988 | Haller ................... | F22B 37/003 122/510 |
| 5,109,915 | A * | 5/1992 | Osusko ................. | F22B 37/003 165/11.2 |
| 9,273,985 | B2 * | 3/2016 | O'Dell .................. | F22B 37/006 |
| 2019/0299301 | A1 * | 10/2019 | Ziegelmeyer .......... | G21C 19/02 |

OTHER PUBLICATIONS

Written Opinion of the International Searching Authority, dated Apr. 20, 2018.
International Search Report, dated Apr. 20, 2018.

* cited by examiner

DRILLING DEVICE FOR MACHINING TUBES IN TUBE SHEETS IN A RADIOACTIVE ENVIRONMENT

CROSS REFERENCE TO RELATED APPLICATIONS

This application is the U.S. national phase of PCT Application No. PCT/EP2017/001291 filed Nov. 7, 2017, which claims priority to German Patent Application No. 02016013247.7 filed Nov. 8, 2016, the disclosures of which are incorporated in their entirety by reference herein.

TECHNICAL FIELD

The present embodiments generally relate to a drilling device for machining tubes in tube sheets of heat exchangers in a radioactive environment.

BACKGROUND

In nuclear power plants, maintenance work and, if necessary, repairs are carried out at regular intervals. At the same time, there are areas in the nuclear power plant that are exposed to radioactive radiation and themselves emit radioactive radiation after some time. The maintenance work and repairs also need to be carried out in this radioactive environment, for example at steam generator tubes or heat exchanger tubes. For people, the radioactive environment is unsuitable and accessible at most briefly. Moreover, according to legal requirements, exposure of personnel and material to radiation has to be as low as possible and may not exceed a particular upper limit. In this regard, the use of a quantity of material that is as small as possible is desirable. In these areas, remote-controllable machine tools or test equipment are also used.

In order to repair tubes that are held in tube sheets, it is possible to attach a drilling machine to a robot arm of a robot and then to move the drilling machine with the robot arm to the point in the radioactive environment that is to be machined, as is shown in U.S. Pat. No. 6,282,461 B1. During machining, it is possible for the drill bit or milling cutter inserted into the drilling machine to become blunt or be damaged, such that the tool has to be changed. To this end, the robot carries the drilling machine to a manhole in the heat exchanger. There, the drilling machine is detached from the robot and an employee takes it in order to change the tool. Subsequently, the drilling machine is transferred back to the robot, which brings the machine tool back to the point to be machined.

This procedure has the drawbacks that a tool change is comparatively complicated, takes a long time and also undesirably exposes the personnel carrying out the tool change to radiation.

Proceeding from this, it is an object of the present disclosure to specify a drilling device with which a tool change is simplified and moreover the exposure of the personnel carrying out the tool change to radiation is reduced.

BRIEF DESCRIPTION OF THE DRAWINGS

In the accompanying drawings, structures are illustrated that, together with the detailed description provided below, describe exemplary embodiments of the claimed apparatus. The drawings are provided for purpose of illustration only and merely depict aspects of typical or example embodiments. These drawings are provided to facilitate the reader's understanding of the disclosure and shall not be considered limiting of the breadth, scope, or applicability of the disclosure.

The elements in the drawing are not necessarily drawn to scale and the proportion of certain elements may be exaggerated for the purpose of illustration. In the drawings, like reference numerals designate corresponding elements throughout the several views. One of ordinary skill in the art will appreciate that elements shown as a single component may be replaced with multiple components, and elements shown as multiple components may be replaced with a single component.

DETAILED DESCRIPTION

Figure 1:
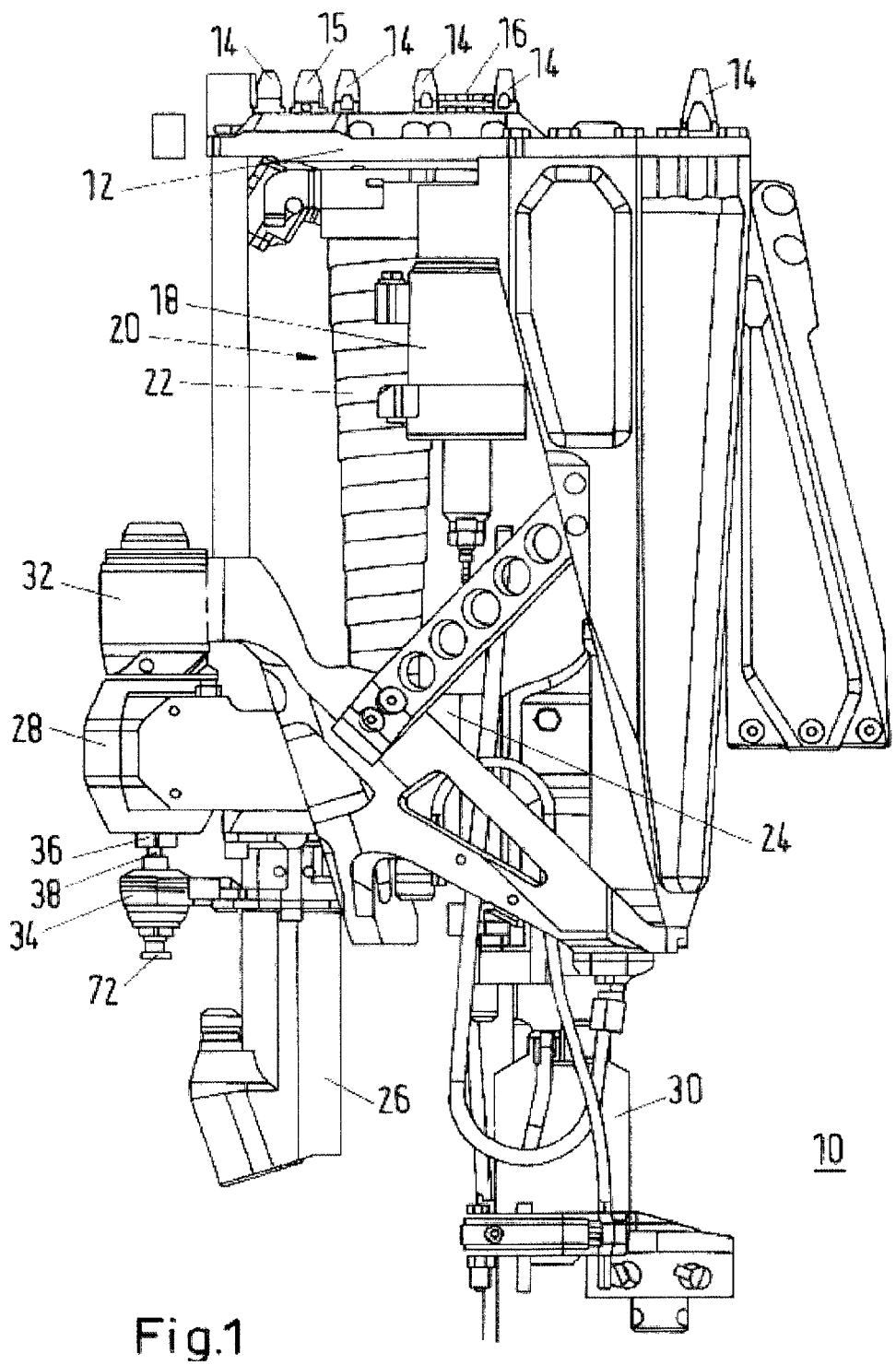
FIG. 1 is a schematic drawing illustrating a side view of one embodiment of an apparatus according to the embodiments described herein, comprising a milling/drilling device.

It should be understood that aspects, features or functions that are described in relation to an embodiment are not necessarily limited to the embodiment described, but rather may be applicable to one or more embodiments, unless expressly described otherwise. Also, the description set forth herein is not to be construed as limited to the embodiments shown. Rather, it is appreciated that various modifications may occur to those skilled in the art that, while not specifically set forth herein, are nevertheless within the spirit and scope of the description. When an embodiment is described as "exemplary" herein, it is to be understood as one non-limiting example embodiment and does not preclude other embodiments that may not include the limitations described in the exemplary embodiment.

The present disclosure describes and illustrates one or more novel embodiments of a drilling device of the type mentioned at the beginning. Said device is characterized in that a retaining plate is clampable in the tubes with at least two retaining fingers on a first side, in that the tool chuck is unlockable from the tool shaft by way of an unlocking instrument, and in that the unlocking instrument is controllable by a remote-control device.

The drilling device according to the embodiments described herein for machining tubes in tube sheets of heat exchangers in a radioactive environment is clampable with the at least two retaining fingers in the tubes of the heat exchanger to be machined. During a tool change, the drilling device can advantageously remain at the tube sheet. In the case of a drilling device according to the embodiments, it is also advantageously ensured that the drill chuck is unlockable from the tool shaft in a remote-controlled manner, without the drilling device being detached from the tube sheet. In the process, for example the drill chuck, together with its tool, for example a drill bit or milling cutter, is gripped by a gripping tool and removed from the drilling device. A drill chuck with a new tool can subsequently be carried to the tool shaft again with the remote-controllable gripping tool. The unlocking instrument then reverses the unlocked state and the new tool chuck is connected to the driveshaft. In this way, the detaching of the drilling device from the tube sheet, the transport of the drilling device to the manhole and the associated exposure of the personnel to radiation when removing the drilling device for the tool change are advantageously dispensed with. The tool change is also simplified and quicker than previously possible. The remote-control device is in this case realizable as a separate instrument. It is also within the concept of the disclosed embodiments for the remote-control device to be integrated in a controller of the drilling device. Moreover, the steam generators of a nuclear power plant are also considered to be heat exchangers.

In one advantageous configuration of the subject matter of the present disclosure, spacer elements are arranged on the first side. The first side also has a tube sheet to be machined. The spacer elements ensure that the retaining plate is in contact at precisely defined points with the tube sheet to be machined. In this way, the retaining plate is arranged parallel to the tube sheet.

Moreover, it is advantageous when a detector, in particular a limit switch, with which a change in position of the retaining plate relative to a tube sheet is able to be ascertained, is arranged on the first side. During operation of the drilling device, it is possible for vibrations caused by the machining of the tube sheet to alter the position of the retaining fingers in the tubes of the tube sheet. The retaining plate may then no longer bear against the tube sheet, and so the machining tool is subject to greater wear or material damage may occur. The detector identifies the altered position of the retaining plate, and so the machining can be interrupted until the retaining plate is back in a correct position. Ideally, the detector is a limit switch that is the same length as the spacer elements, such that any change in spacing between the spacer elements and the tube sheet causes a switching operation, in particular the switching off of machining.

A particularly advantageous configuration of the drilling device is achieved in that the unlocking instrument has an unlocking device, an actuating element and an actuating device, in that, on a second end side of a hollow tool driveshaft, the unlocking device is arranged at least partially in the hollow shaft and connected thereto, in that the actuating element is guided through the actuating device, in that the actuating element is movable at least temporarily into an unlocked position from a locked position by the actuating device, and in that the tool chuck is driven by the tool shaft in the locked position.

With an unlocking instrument configured in such a way, robust and less fault-prone unlocking for the tool chuck is achieved. Suitable tool chucks are in particular floating chucks, which act in a self-centering manner as compensating chucks and also allow an axial shift or an axial offset between a hole center and the axis position of the driveshaft.

The drilling device according to the present disclosure is simplified when the locking device has a spring element, the spring forces of which retain the actuating element in the locking position. This ensures that, even in the event of failure of auxiliary energy, the tool chuck is locked to the tool shaft.

In a further configuration of the subject matter of the present disclosure, a plurality of balls are retained in a groove of the tool chuck by the actuating element in the locked position, and the tool chuck is fixed in an axial direction by the balls. In this way, the tool is fixed in the axial direction of the tool shaft, making it possible to work particularly precisely with negligible play. This also makes it possible to work particularly precisely with forward feed.

A development of the drilling device is achieved when the actuating element is an locking pin that has a cap, and when an unlocking element (e.g., a pulling piston) of the unlocking device cooperates with the cap for unlocking, such that the cap is moved together with the locking pin in an axial direction of the tool shaft. Unlocking may be particularly reliably in this embodiment.

A further advantage is achieved when the unlocking element is configured as a hollow cylinder (piston) through which the locking pin engages, and when the dimensions of the locking pin are coordinated with the unlocking element such that the locking pin and hollow cylinder (piston) are not in contact in the locking position. In this way, wear of the actuating pin and hollow cylinder (piston) as a result of the rotary movement of the actuating pin during operation is avoided.

In another preferred embodiment, a control device is connected to the first drive and/or to the second drive and/or to the feed device and/or to the unlocking instrument. In principle, it is also possible for all drives, the forward feed or the unlocking instrument to also be operated manually. The control device has the advantage that particular operating logic[s] can be reproduced in the controller, for example automatic switching off, when the detector outputs a signal that the position of the retaining plate has changed relative to the tube sheet.

The following table lists elements of the illustrated embodiments of the disclosure and their associated reference numbers for convenience.

REF NO. ELEMENT

10 Drilling instrument
12 Retaining plate
14 Stop studs
15 Detector
16 Clamping elements
18 Clamping element drive
20 Spindle
22 Spindle casing
24 Transmission
26 Spindle drive
28 Cantilever transmission
30 First drive/Hydraulic drive
32 Floating chuck
34 Unlocking device
36 Actuating device/Locking unit
38 Actuating element/Locking pin
42 Transmission housing
44 Spindle housing
46 Spindle nut
48 First gearwheel
50 Second gearwheel
52 Nut housing
54 Drive side
56 Output gearwheel
57 Output shaft/tool driveshaft
58 Output side
60 Cutout in the form of a hexagon socket
62 Locking unit (36)
64 Locking sleeve
66 Balls
68 Locking pin (38)
70 First compression spring
72 Pulling cap
74 Unlocking element/Pulling (hollow) piston
76 First portion
78 Second portion
80 Second compression spring FIG. 1 shows an example of a drilling instrument 10 designed for machining tubes in heat exchangers. Heat exchangers in nuclear power plants for example steam generators and tube heat exchangers, in which usually a bundle of individual tubes is held in at least two tube sheets. The drilling instrument 10 can take all tools that are driven by the rotary movement of a drive shaft, i.e. for example milling cutters or drill bits (not shown). The drilling instrument 10 has a retaining plate 12, wherein a number of stop studs 14 are arranged on a first side of the latter. In this case, the first side faces a tube sheet of the heat exchanger or tube sheet to be machined, the latter not being illustrated in the figure, however. The drilling instrument 10 is moved up to the tube sheet such that the stop studs 14 come into contact therewith. This takes place for example through the use of a correspondingly designed robot. The drilling instrument 10 is connected to the tube sheet in that at least two clamping elements 16 are introduced into a corresponding number of tubes in the tube sheet and are clamped there. Of the clamping elements 16, only one is shown in the figure, specifically in a transport position. A clamping element drive 18 makes it possible for the clamping element 16 assigned to the drive to be movable in the direction of the tube sheet, perpendicular to the first side. To this end, the retaining plate 12 has a cutout, through which the clamping element 16 engages if necessary, specifically beyond the stop studs 14 to such an extent that they extend into a tube of the tube sheet. Subsequently, with the clamping element drive 18, the particular clamping element 16 located in the tube is braced with a tube wall in that that part of the clamping element 16 that is located in the tube is spread. Also arranged on the first side is a detector 15, which is at or about the same length as the stop studs 14. Should, for any reason, the position of the retaining plate 12 change relative to the tube sheet, for example because one of the clamping elements 16 slips in its tube on account of vibrations during machining, this change in state is sensed by the detector 15 and an appropriate signal is transmitted to a controller (not shown) of the drilling instrument 10. The detector 15 is embodied, in a preferred embodiment, as a limit switch at the same length as the stop studs 14.

With continuing reference to FIG. 1, on a second side (opposite the first side) of the retaining plate 12, the drilling instrument 10 has a spindle 20, which is concealed by a spindle casing 22 in this view. The spindle 20 has, at one end, a bearing (not shown), which is arranged on the second side of the retaining plate. The spindle 20 engages through a transmission 24, wherein, on that side of the transmission 24 that is remote from the retaining plate 12, a spindle drive 26 is connected to a housing of the transmission 24. A hydraulic drive 30 drives a tool driveshaft of the main transmission 24, wherein, on the output side thereof, a cantilever transmission 28 is connected to the main transmission 24. The tool driveshaft of the cantilever transmission 28 is designed to receive and drive a floating chuck 32 on that side of the driveshaft that faces the retaining plate 12. The floating chuck 32 is a compensating tool chuck that ensures a connection to the machining tool (not shown), for example a milling cutter, and at the same time, in the event of angular or position faults of the tool, acts in a compensating and/or self-centering manner. Arranged on the other side of the driveshaft is an unlocking device 34, which is connected to a housing of the spindle drive 26, wherein a locking unit an actuating device 36, which has an actuating element 38, is screwed into the driveshaft. In one or more embodiments, the actuating device is a locking unit and the actuating element is a locking pin. The actuating element/ locking pin 38 engages through the unlocking device 34 and is provided at its distal end with a pulling cap 72. The unlocking device 34 has the objective, in the event that the floating chuck 32 is intended to be removed from the cantilever transmission 28, of moving the actuating element/ locking pin 38 in the direction away from the retaining plate 12 and thus unlocking the floating chuck 32. The latter can then be removed from the cantilever transmission for example with a gripping tool (not shown), which is also attachable to a rod as gripping tool holder, and another tool chuck with a different tool can in turn be inserted into the cantilever transmission 28. In this way, a comparatively rapid tool change takes place. Personnel are not exposed to any or to a correspondingly lower amount of radiation. The tool is in this case changed in each case together with a tool chuck.

Figure 2:
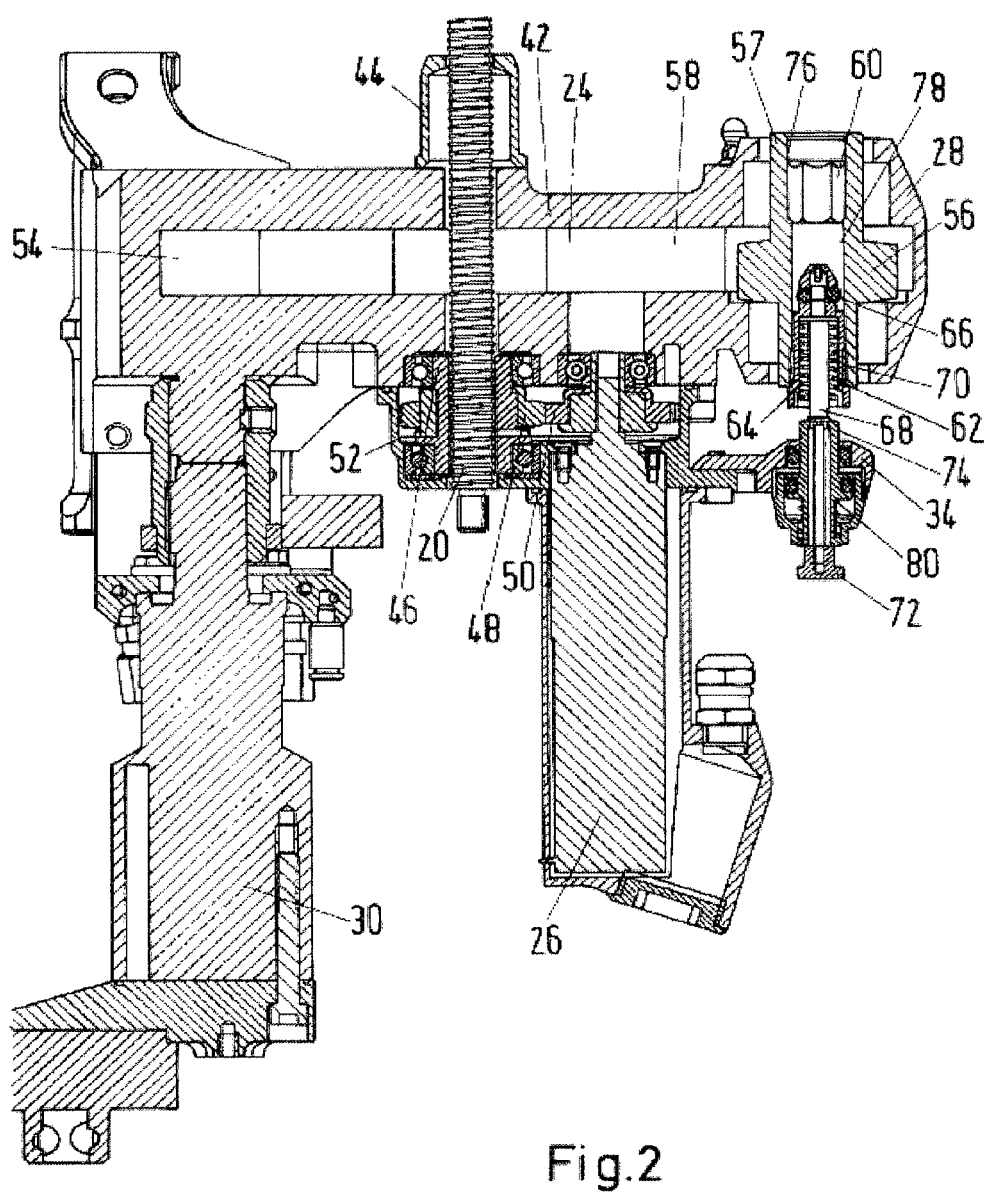
FIG. 2 is a schematic drawing illustrating a sectional view of a portion of the milling/drilling device of FIG. 1.

FIG. 2 shows a cross section through a part of the drilling instrument 10 shown in Fig., including the unlocking device 34 and cantilever transmission 28. The main transmission 24 has, in this exemplary embodiment, five gearwheels, although these are not illustrated specifically. The middle one of the gearwheels and a transmission housing 42 of the transmission 24 have cutouts, through which the spindle 20 may be passed. A spindle housing 44 may be attached to the transmission housing 42 and, on the side facing the spindle drive 26, a spindle nut 46 may be screwed onto, which is connected to a first gearwheel 48, the spindle 20, which is embodied as a threaded spindle. The first gearwheel 48 is driven by a second gearwheel 50, which is arranged on the shaft of the spindle drive 26 and is driven thereby. The spindle nut 46 is arranged in a nut housing 52 and connected to the transmission housing 42. When the spindle drive 26 is activated and the spindle nut 46 rotates in this way, the transmission 24, together with all its connected parts, is moved toward or away from the retaining plate 12 as per the direction of rotation. The spindle drive 26 is may also be controllable by the controller (not shown). In this way, a forward feed unit is realized.

Hydraulic drive 30 is connected to a drive side 54 of the transmission 24. Arranged in the cantilever transmission 28 is an output gearwheel 56, which is driven by an output side 58 of the transmission 24 and is integrally formed on an output shaft/tool driveshaft 57. Centrally, the output gearwheel 56 has a hole, which is widened on the end side facing the retaining plate 12 to form a cutout 60 in the form of, for example, a hexagon socket and on the other end side has an internal thread. Screwed in this internal thread is a locking unit 62, which has a locking sleeve 64 in which further cutouts are provided, in each of which a ball is arranged. A locking pin 68 is pushed in the direction of the retaining plate 12 by a pin compression spring 70, wherein the locking pin 68 is configured such that it pushes the balls 66 radially outward in the process. The unlocking device 34 is in the view shown in FIG. 2 spaced apart from the cantilever transmission 28, on the side remote from the retaining plate 12, to such an extent that there is no contact with the locking sleeve 64. The locking pin 68 has a length which is measured such that it passes through the unlocking device 34 and is connected at its free end (distal end) to a pulling cap 72 by means of a screw connection. Arranged in the unlocking device 34 is [a] an unlocking element (pulling piston) 74, which encloses the locking pin 68. In this case, an internal bore (hollow cylinder) in the pulling piston 74 is coordinated with the diameter of the locking pin 68 such that contact between the two components in the operating state is avoided. The operating state is understood as meaning the state of the drilling instrument 10 when the hydraulic drive 30 is running and thus the output shaft 57 is being driven.

The locking of a tool chuck and the unlocking thereof in the output/tool shaft 57 are explained in more detail in the following text. FIG. 2 shows the output shaft 57 without a tool chuck and has, at its centrally located cutout, a first 76 and a second portion 78 with different diameters. The portions 76, 78 are spaced apart from one another to such an extent that a high level of concentricity is achieved and at the same time comparatively little play is achieved. As a result of the cutout 60 in the form of a hexagon socket, for example, the torques of the output shaft 57 are transmitted to the tool chuck and thus to the tool. When the tool chuck is locked to the output shaft 57, the balls 66 are pushed by the locking unit 62 into a groove (not shown), adapted thereto, in the tool chuck. In this way, the tool chuck is fixed to the output shaft 57 in the axial direction. In order to unlock or release the tool chuck, the drive of the output shaft 57 is switched off and the pulling piston 74 is moved counter to a spring force of [a] locking spring 80, such that said pulling piston 74 bears against the pulling cap 72 and moves the latter together with the locking pin 68. The pulling piston 74 is in this case driven by a hydraulic, pneumatic or electric drive. The locking pin 68 is in this case moved to such an extent that balls 66 slide back into the corresponding cutouts in the locking sleeve 64. To this end, that end of the locking sleeve 64 that faces the balls 66 is configured in a conical manner, wherein the configuration can also have several cones with different gradients. In this way, the sliding of the balls 66 into or out of the cutouts is ensured particularly well. If the balls 66 are positioned in their cutouts in the locking sleeve 64, the tool chuck is unlocked or released and the output shaft 57 is removable (able to be disengaged from the removable tool chuck). If another tool chuck, for example a floating chuck, is intended to be connected to the output shaft 57, said chuck is plugged into the output shaft 57 and the drive of the pulling piston 74 is switched off. The spring force of the spring 80 pushes the pulling piston 74 back into its starting position in the process. In this way, the locking pin 68 is released again and is pushed in the direction of the retaining plate 12 again by the spring force of the compression spring 70. In the process, the balls 66 are pushed by the spherical end of the locking pin 74 into a corresponding groove in the floating chuck, such that the latter is now locked to the output shaft 57.

Unless the context clearly requires otherwise, throughout the description and the claims, words using the singular or plural number also include the plural or singular number respectively. Additionally, the words "herein," "above," "below" and words of similar import, when used in this application, refer to this application as a whole and not to any particular portions of this application. "Or" means "and/or." Further, the conjunction "or" covers all of the following interpretations of the word: any of the items in the list, all of the items in the list and any combination of the items in the list. It should further be noted that the terms "first," "second," "primary," "secondary," and the like herein do not denote any order, quantity, or importance, but rather are used to distinguish one element from another.

The various embodiments described above are provided by way of illustration only and should not be construed to limit the scope of the disclosure. Those skilled in the art will readily recognize various modifications and changes that may be made to the principles described herein without following the example embodiments illustrated and described herein, and without departing from the spirit and scope of the disclosure. We therefore claim as our invention all that comes within the scope of these claims.

The invention claimed is:

1. A drilling device for machining tubes in tube sheets of heat exchangers in a radioactive environment, comprising:
    a retaining plate having a first side and a second side and at least two retaining fingers operatively connected to the first side that are configured to be clamped in the tubes;
    an unlocking instrument;
    a tool driveshaft having a first end and a second end opposite the first end;
    a first drive arranged on the second side of the retaining plate and configured to drive the tool driveshaft;
    a feed device arranged on the second side of the retaining plate and configured to provide a forward feed to the tool driveshaft; and
    a tool chuck located at the first end of the tool driveshaft and detachably connected thereto, wherein the tool chuck is unlockable from the tool driveshaft by the unlocking instrument, and wherein the unlocking instrument is controllable by a remote-controlled device.

2. The drilling device as claimed in claim 1, further comprising spacer elements arranged on the first side.

3. The drilling device as claimed in claim 1, further comprising a limit switch arranged on the first side of the retaining plate and configured to detect a change in position of the retaining plate relative to the tube sheet.

4. The drilling device as claimed in claim 1, wherein the unlocking instrument comprises an unlocking device, an actuating element and an actuating device, wherein the actuating device is arranged at least partially in the tool driveshaft and connected thereto at the second end of the tool driveshaft and wherein the actuating element is guided by the unlocking device, and wherein the actuating element is movable at least temporarily into an unlocked position from a locked position by the unlocking device and wherein the tool chuck is capable of being driven by the tool shaft when the actuating element is in the locked position.

5. The drilling device as claimed in claim 4, wherein the actuating device comprises a first compression spring configured to bias the actuating element in the locked position.

6. The drilling device as claimed in claim 5, further comprising a plurality of balls that are retained in one or more grooves of the tool chuck by the actuating element in the locked position wherein the tool chuck is fixed in an axial direction by the balls.

7. The drilling device as claimed in claim 5, wherein the unlocking device comprises an unlocking element, wherein the actuating element comprises a locking pin having a cap, at one end and wherein the unlocking element cooperates with the cap to unlock the tool chuck, such that the cap is moved together with the locking pin in an axial direction of the tool shaft.

8. The drilling device as claimed in claim 7, wherein the unlocking element comprises a hollow piston through which the locking pin engages, and wherein the dimensions of the locking pin are coordinated with the hollow piston such that the locking pin and hollow piston are not in contact in the locked position.

9. The drilling device as claimed in claim 8, wherein the unlocking device further comprises a second compression spring, wherein the second compression spring is configured to bias the unlocking element in the locked position.

10. The drilling device as claimed in claim 5, wherein the tool driveshaft is in the form of a hollow shaft.

11. The drilling device as claimed in claim 5 further comprising a transmission interposed between the first drive and the tool driveshaft.

12. The drilling device as claimed in claim 5 wherein the feed device comprises a threaded spindle, a spindle drive and a spindle transmission, wherein the spindle drive is configured to drive the threaded spindle via the spindle transmission.

13. The drilling device as claimed in claim 12 wherein the spindle transmission comprises a spindle nut having a gearwheel integral thereto that is threadably attached to the threaded spindle and is driven by the spindle drive.

14. The drilling device as claimed in claim 5 further comprising a control device, wherein the control device is interfaced with and controls one or more of the first drive, feed device, and unlocking instrument.

* * * * *